D. JANNOPOULO.
Vehicle-Top.
No. 205,098. Patented June 18, 1878.
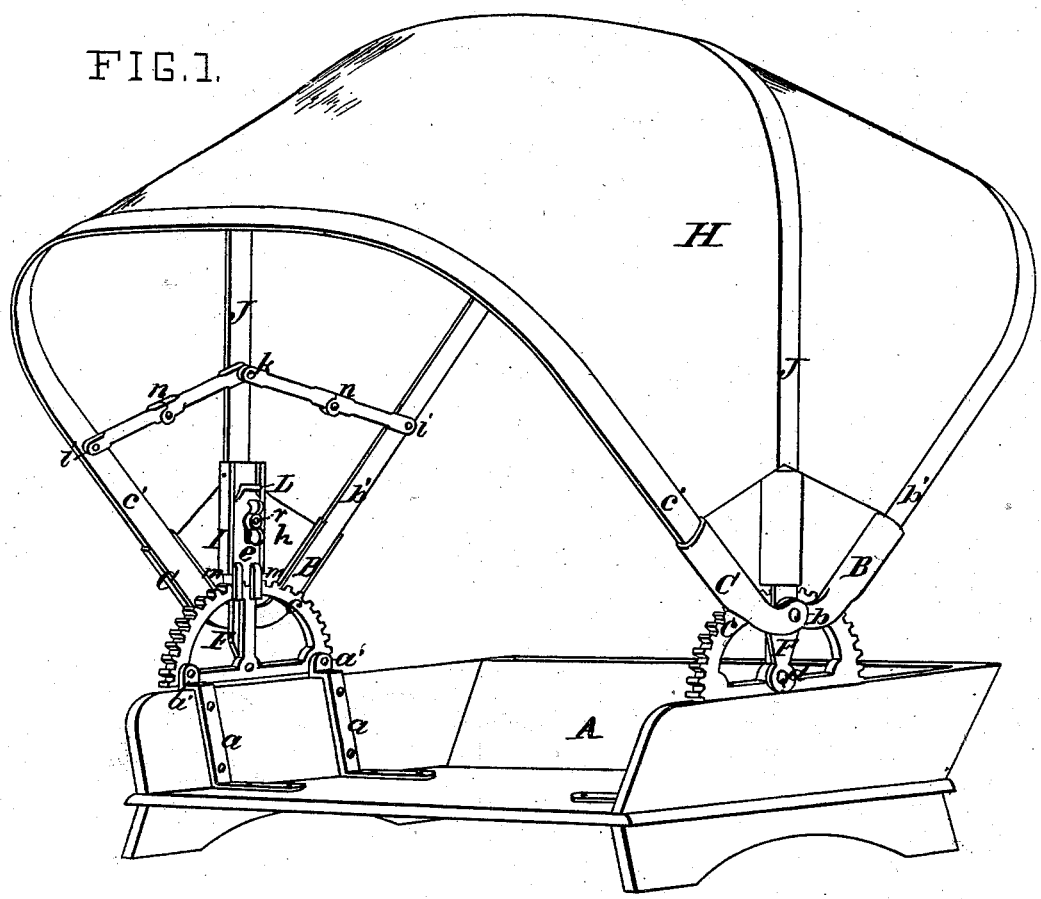
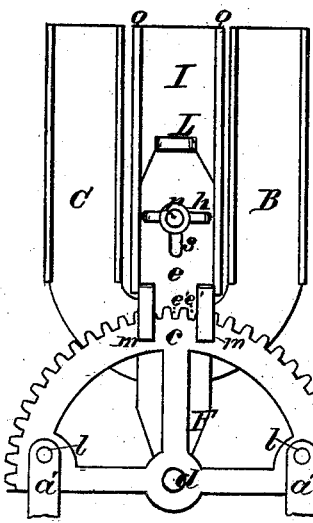

UNITED STATES PATENT OFFICE.

DEMETRIUS JANNOPOULO, OF ST. LOUIS, MISSOURI.

IMPROVEMENT IN VEHICLE-TOPS.

Specification forming part of Letters Patent No. 205,098, dated June 18, 1878; application filed March 29, 1878.

*To all whom it may concern:*

Be it known that I, DEMETRIUS JANNOPOULO, of the city of St. Louis and State of Missouri, have invented certain new and useful Improvements in Wagon-Seat Awnings; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to awnings or tops for buggies and for the seats of other vehicles; and consists in certain improvements upon a certain invention for which Letters Patent No. 183,399 were duly issued to me the 17th day of October, 1876, the object of this invention being to provide an efficient and adjustable retentive device for setting and firmly holding the awning or top either in a vertical position or at any desired inclination.

In the accompanying drawing, forming a part of this specification, Figure 1 is a perspective view, showing my invention applied to a buggy or wagon seat. Fig. 2 is a detached view of the inner side of my device.

In the said drawing, A designates the buggy or wagon seat, to which the semicircular racks $c$ are firmly secured by means of nutted bolts $l$, passing through eyes in the straps $a$, which are fastened to the seat, as shown.

The central bow-sockets F, which receive the ends of central bow J, are pivoted each at $d$ to a bar forming the base of a rack, $c$, and on said pivot $d$ the top-frame rests and is easily turned.

B and C severally indicate sockets, which receive and hold the ends of wing-bows $b'$ and $c'$, said sockets being pivoted at $b$ to the central bow-socket F. The said socket F has formed on the side thereof toward the interior of the wagon a way for a dog or sliding plate, $e$, said way consisting of the plate I and flanges O.

The sliding dog $e$ has teeth $e'$ formed on its lower end to match with the teeth of rack $c$, and is also provided with the clasping-fingers $m$, which overlap the rack $c$, as seen in Fig. 2, the said fingers $m$ forming an additional support, and relieving the pivot $d$ from much of the strain caused by the swaying of the buggy-top. The dog-plate $e$ is further provided with a slot, $s$, through which projects a screw-bolt, $r$, which is fixed to the plate I, a thumb-nut, $h$, being used in connection with bolt $r$ to clamp the plate $e$ in position, as desired.

A finger-piece, L, at the upper end of plate $e$, is used to raise or lower the dog from or into connection with the rack $c$.

The bows forming the top-frame are provided with folding extension-joints, as shown in the drawing, having stop-hinges at $n$, and being pivoted to the bows at $k$ and $i$, such joints being found preferable for fixing and holding the bows in position. H designates the covering of the frame formed by the bows.

The operation of my improved adjustable device is quite simple. Ordinarily the central bow J is in a vertical position, the dog $e$ being moved down—an upward and downward movement being allowed by the slot $s$—so that its teeth $e'$ close with the teeth of rack $c$, the fingers $m$ overlapping the rack, and the thumb-nut $h$ being turned on the fixed screw $r$ to clamp the plate $e$ in place.

When the top or awning is not used as a shade or shelter from the sun or weather, the thumb-nut $h$ is readily turned to release the dog $e$, which latter is raised from the rack $c$, and the top may then be turned back to any desired angle or inclination, and fixed in position by closing the dog on the rack and clamping it as before.

Having described my invention, I claim—

1. In a top or awning frame holding device, the central bow-socket F, provided with the way, the toothed dog $e$, provided with a clamp, and the semicircular rack $c$, substantially as set forth.

2. The bow-sockets F, B, and C, pivoted as shown, the toothed sliding dog $e$, provided with the fingers $m$, in combination with the fixed rack $c$, as herein set forth.

3. In combination, the way I O on socket F, the sliding dog $e$, having the finger-piece L and fingers $m$, and the rack $c$, as and for the purposes described.

In testimony that I claim the foregoing as my own invention I affix my signature in presence of two witnesses.

DEMETRIUS JANNOPOULO.

Witnesses:
ALEX. J. THOMSON,
W. F. DALY.